United States Patent [19]
Jeddeloh

[11] Patent Number: 5,905,858
[45] Date of Patent: May 18, 1999

[54] SYSTEM FOR METHOD MEMORY ERROR HANDLING

[75] Inventor: Joseph Jeddeloh, Minneapolis, Minn.

[73] Assignee: Micron Electronics, Inc., Nampa, Id.

[21] Appl. No.: 08/742,773

[22] Filed: Nov. 1, 1996

[51] Int. Cl.$^6$ .................................................. G06F 11/08
[52] U.S. Cl. ............................ 395/185.05; 395/182.03; 395/183.18; 371/40.1
[58] Field of Search ..................... 395/185.05, 182.03, 395/183.18, 183.2, 293; 371/41, 40.1, 51.1, 40.12, 40.13, 37.7, 40.2; 365/200

[56] References Cited

U.S. PATENT DOCUMENTS

| | | | |
|---|---|---|---|
| 3,668,644 | 6/1972 | Looschen | 395/185.05 |
| 5,499,384 | 3/1996 | Lentz et al. | 395/821 |
| 5,550,988 | 8/1996 | Sarangdhar et al. | 395/293 |
| 5,588,112 | 12/1996 | Dearth et al. | 371/40.2 |
| 5,604,753 | 2/1997 | Bauer et al. | 371/40.11 |

*Primary Examiner*—Robert W. Beausoliel, Jr.
*Assistant Examiner*—Pierre E. Elisca
*Attorney, Agent, or Firm*—Seed and Berry LLP

[57] ABSTRACT

A computer system stores data according to a plurality of different error handling schemes. The computer system includes a memory controller with a plurality of different error handling modules, each of which can be selectively associated with one or more memory blocks. Each of the error handling modules is structured to write data to and read data from its associated memory block according to a different error handling scheme. A memory controller includes a separate configuration register for each of the plurality of memory blocks. Each configuration register stores an indication of the error handling module that will be employed to write data to and read data from the memory block associated with the configuration register.

16 Claims, 6 Drawing Sheets

SYSTEM FOR METHOD MEMORY ERROR HANDLING

TECHNICAL FIELD

The present invention relates to computer memory, and more particularly, to a system and method for allowing memory devices having defective memory locations to be used in high accuracy applications.

BACKGROUND OF THE INVENTION

Substantially all modern electronic computers rely on semiconductor memory to store data for processing by a central processing unit (CPU). Such computers employing semiconductor memory vary from simple computers, such as those contained in telephone answering machines, to highly complex supercomputers employed for complicated scientific projects. In simple computers like those used for telephone answering machines, errors in one or more of the memory locations of the memory may not be fatal. For example, a mistake in the memory of the telephone answering machine likely would only cause the synthesized voice stored on the memory to be imperceptibly altered. However, one or more defective memory locations in a memory of a computer used to perform scientific calculations may cause substantial problems.

Although current manufacturing techniques have substantially reduced the number of defective memory locations, excessive numbers of defective memory locations are still sometimes produced during fabrication of computer memory. Those defective memory locations can be caused by any of numerous steps taken during manufacture of the memory chips, semiconductor crystallinity defects, electrical connector discontinuities, etc. Although memory chips with such defective memory locations typically represent a small portion (less than 1%) of the total number of memory chips produced, the actual number of such defective memory chips is substantial. In some cases, such defective memory chips could be sold at a greatly reduced price for applications that do not require perfect memory, such as for telephone answering machines. However, it would be beneficial if some of those memory chips could be employed in more critical applications, such as in personal computers.

Several prior art error handling schemes have been employed to compensate for defective memory locations. For example, one error handling scheme employs extra rows of memory cells, known as "redundant rows," that could be used to replace rows having defective memory cells. While the use of redundant rows is often successful in salvaging otherwise defective memory chips, the number of defective rows that can be replaced is limited to the number of redundant rows that are provided on the memory chip. The number of defective rows sometimes exceeds the number of redundant rows, thus preventing repair of some defective rows.

Another prior art error handling scheme, known as error detection, detects when a single bit of a data word is in error. Error detection typically adds a single parity bit to each data word written to memory in order to make the sum of the data word and the parity be an even number. If the sum of the data word and the parity bit is an odd number when the data word is read, then the error detection scheme determines that one of the bits of the data word is in error. Such parity-based error detection often is inadequate because only single bit errors are detected, the particular bit in error is not identified, and the particular bit in error is not corrected.

Yet another error handling scheme, known as error correction, overcomes some of the deficiencies in prior art error detection schemes. Hardware error correction schemes add to each data word plural error correction bits that enable the data word to be reconstituted in the event of an erroneous data bit within the data word. However, such prior art error correction schemes typically only reconstitute a data word if only a single bit of the data word is erroneous. Moreover, such error correction schemes add several extra data bits to each data word which results in high memory overhead. In addition, such error correction schemes could be extended to correct multiple erroneous data bits, but the memory overhead that would result likely would be unacceptable.

Although each of the prior art error handling schemes provide some protection for defective memory locations, none of them are perfect. Some require excessive memory overhead while others provide inadequate protection. Moreover, prior art error handling schemes are employed on a system-wide basis, that is, the entire working memory of a computer system is accessed according to a single error handling system regardless of the applications for which the computer system is being used.

SUMMARY OF THE INVENTION

A preferred embodiment of the present invention is directed to a method and computer system for storing data subject to memory errors. The preferred embodiment includes a memory controller with a plurality of different error handing modules, each of which can be selectively associated with one or more memory blocks. Each of the error handling modules is structured to write data to and read data from its associated memory block according to a different error handling scheme. Preferably, the error handling modules include an error detection module, an error correction module, and a memory remapping module. In addition, preferably there is also an option for the memory controller to write data to and read data from a memory block without performing any error handling.

In the preferred embodiment, the memory controller includes a separate configuration register for each of the plurality of memory blocks. Each configuration register stores an indication of the error handling module that will be employed to write data to and read data from the memory block associated with the configuration register. Such configuration registers enable the computer system designer or users to specify which error handling module is most appropriate for the associated error block based on the applications for which the memory blocks will be employed.

DETAILED DESCRIPTION OF THE INVENTION

Figure 1:
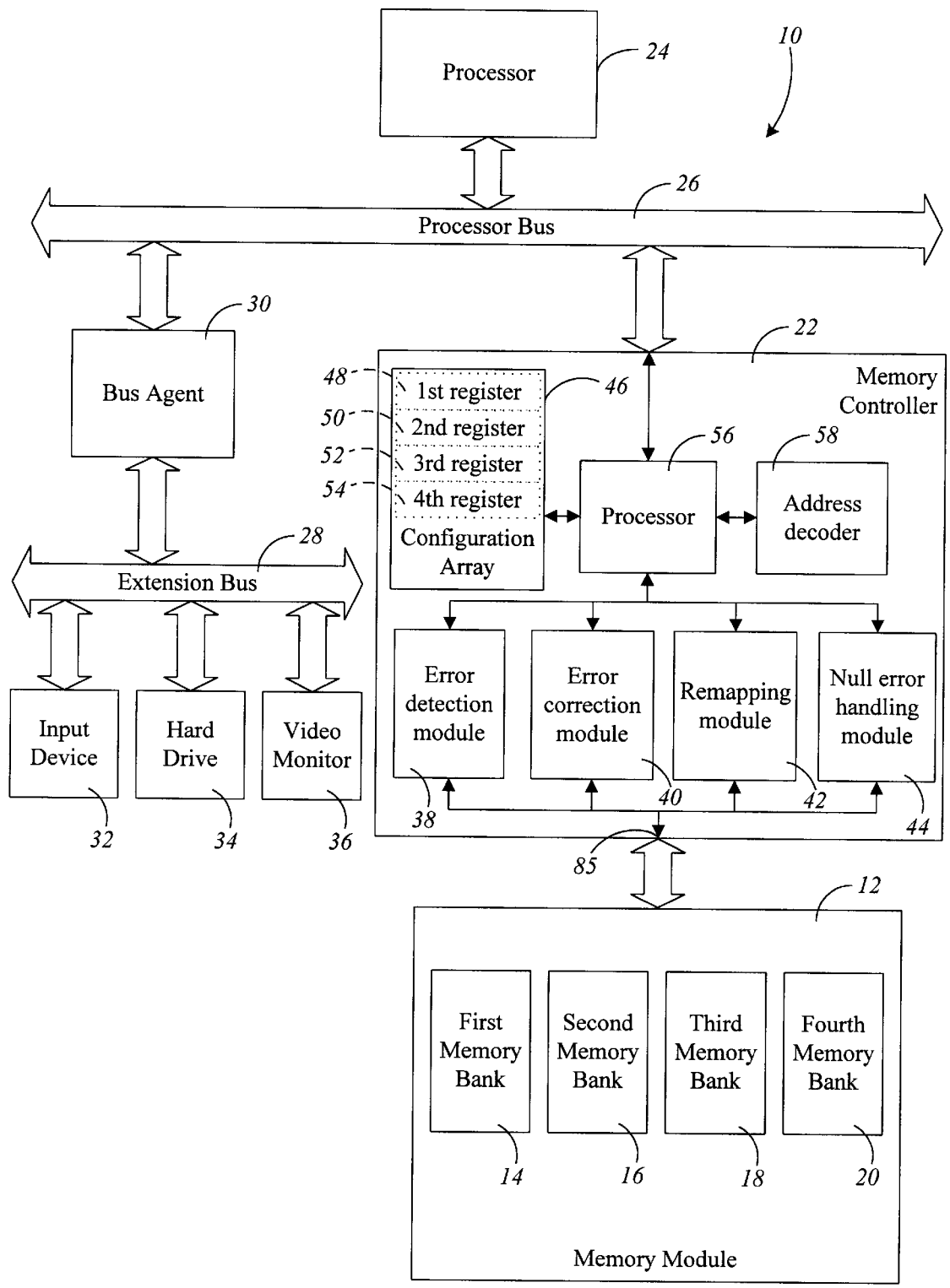
FIG. 1 is a block diagram of a computer system for selective memory error handling according to a preferred embodiment of the present invention.

A computer system 10 for storing data in a memory module 12 is shown in FIG. 1. The memory module 12 can be any of numerous types of memory modules, such as a double in-line memory module (DIMM). The memory module 12 includes first through fourth memory banks 14, 16, 18, 20 that are each structured to store data according to one or more error handling schemes. Of course, the memory module 12 could have more or less than the four memory banks 14–20 shown in FIG. 1 without departing from the invention.

The computer system 10 includes a memory controller 22 that controls the manner in which data is written to or read from the memory banks 14–20 of the memory module 12. The memory controller 22 interfaces the memory module 12 with a computer processor 24 via a processor bus 26. As is typical, the computer system 10 also includes an extension bus 28 that is coupled to the processor bus 26 by a bus agent 30. Coupled to the extension bus 28 are an input device 32, such as a keyboard, mouse, or electronic pen/tablet, a hard drive 34, and a video monitor 36.

In contrast to prior art memory controllers, the memory controller 22 includes a plurality of error handling modules 38, 40, 42, 44. Each of the plurality of error handling modules 38–44 is structured to write data to or read data from the memory module 12 based on a different error correction scheme. In the preferred embodiment shown in FIG. 1, the plurality of error handling modules 38–44 includes an error detection module 38, an error correction module 40, a remapping module 42 and a null error handling module 44. However, the concept of providing a plurality of error handling modules would be effective using other or different numbers of error handling modules.

In the preferred embodiment, the memory controller 22 includes a configuration array 46 with configuration registers 48, 50, 52, 54 that keep track of which of the plurality of error handling modules 38–44 is employed for each of the memory banks 14–20 of the memory module 12. Associated with the first memory bank 14 is a first configuration register 48 that stores an indication of which of the plurality of error handling modules 38–44 will be employed to write data to and read data from the first memory bank 14. Similarly, associated with the second, third and fourth memory banks 16, 18, 20 are second, third and fourth configuration registers 50, 52, 54, respectively, which each store an indication of which of the error handling modules 38–44 will be used to write data to and read data from the memory bank associated with the configuration register. Although the preferred embodiment employs a separate configuration register for each of the memory banks 14–20, the memory controller 22 could include a configuration register that indicates the error handling scheme to be employed for plural memory banks or for one or more memory blocks within a memory bank.

The memory controller 22 also includes a processor 56 and an address decoder 58 that enable the memory controller 22 to respond to requests for access to the memory module 12 from the processor 24 or bus agent 30 via the processor bus 26. The processor 56 preferably is a general purpose microprocessor programmed with software to perform memory control functions, but could also be of a hard-wired circuit design. The address decoder 58 stores a table that includes an indication of which memory addresses are associated with each of the memory banks 14–20. That is, the address decoder 58 stores a definition of the address boundaries for each of the memory banks 14–20. Similarly, the address decoder 58 could store address boundaries for memory blocks larger or smaller than a memory bank so that separate error handling schemes could be employed with each of the memory blocks.

Figure 2:
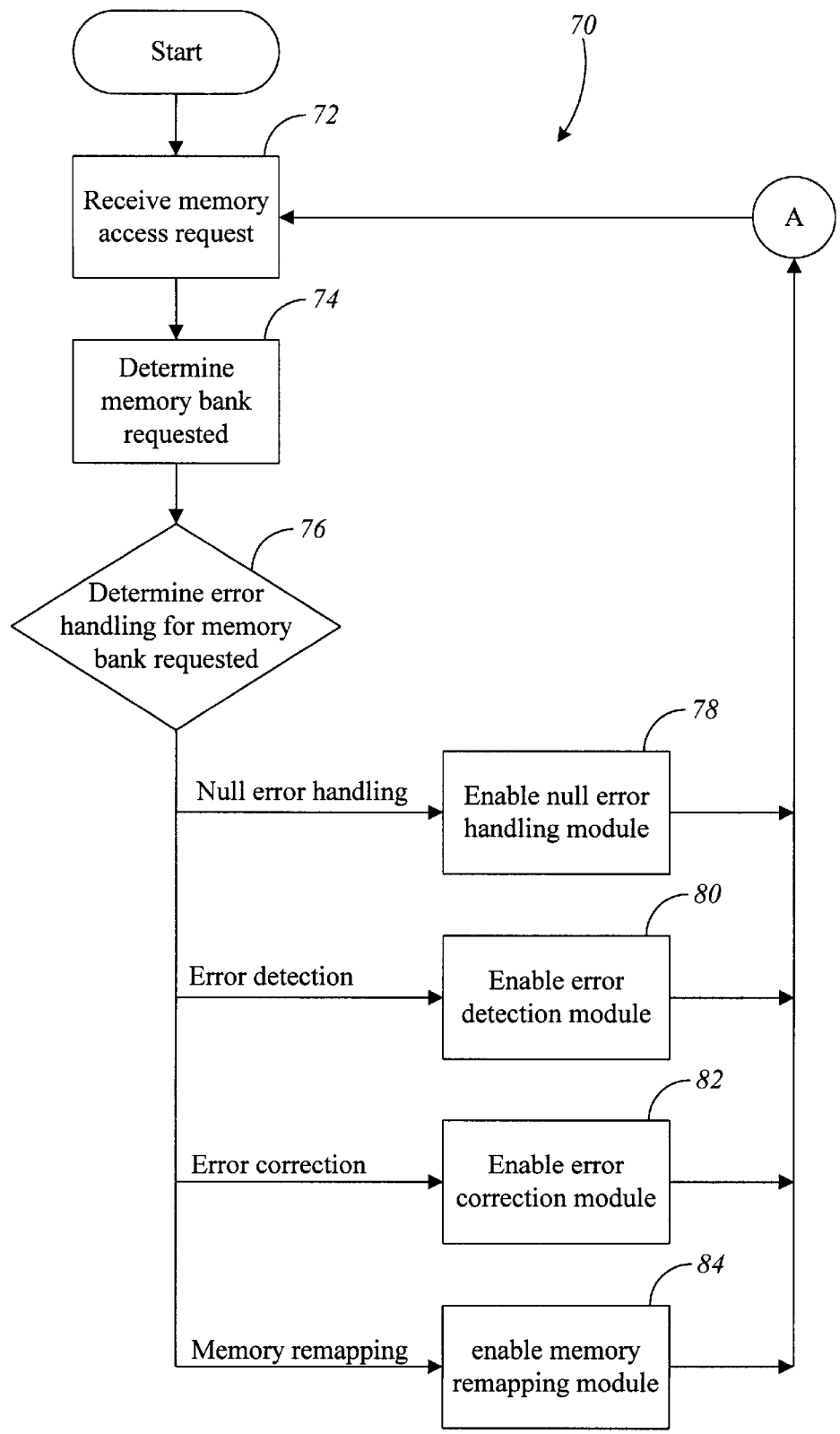
FIG. 2 is a flowchart showing a method for selective memory error handling according to a preferred embodiment of the present invention.

A flowchart 70 of a software routine executed by the processor 56 for storing data in a plurality of memory banks according to a preferred embodiment of the present invention is shown in FIG. 2. In step 72, the processor 56 receives a request for access to a memory portion of one of the memory banks 14–20. The memory access request received by the processor 56 typically includes an indication of whether a read or a write is being requested together with an address of the memory portion in the memory module 12 that is being requested. In addition, if a write operation is being requested, then the memory access request will include a data word intended to be written to the address provided in the memory access request.

In step 74, the processor 56 determines which of the memory banks 14–20 includes the memory portion requested by the memory access request received in step 72. The memory controller processor 56 preferably implements step 74 by determining which memory bank has an address boundary definition in the address decoder 58 that includes the requested memory portion. Alternatively, the address boundary definitions for each memory bank could be pre-programmed into the processor 56. However, employing an address decoder 58 enables the address boundary definitions to be modified to account for a change in the error handling schemes associated with each memory bank.

In step 76, the processor 56 determines which error handling scheme has been selected for the memory bank requested. Preferably, the processor 56 performs step 76 using the particular one of the configuration registers 48–54 that is associated with the requested memory bank. Employing a different configuration register for each of the memory banks 14–20 enables the error detection scheme selected for each memory bank to be revised as desired. Alternatively, the error correction scheme selected for each of the memory banks 14–20 could be permanently fixed in the processor 56 without employing a configuration register array 46.

In the method 70 shown in FIG. 2, there are four possible error detection schemes that could be determined in step 76 for the memory bank requested. If the processor 56 determines in step 76 that a null error handling scheme has been selected for the requested memory bank, then in step 78 the processor 56 causes the null error handling module 44 to perform the requested operation without employing any positive error handling scheme. If the processor 56 determines in step 76 that error detection has been selected for the requested memory bank, then the processor 56 causes the error detection module 38 to perform the requested operation using the error detection scheme. If the processor determines in step 76 that error correction has been selected for the requested memory bank, then in step 82 the processor 56 causes the error correction module 40 to perform the requested operation according to the error correction scheme. If the processor 56 determines that memory remapping has been selected for the requested memory bank, then in step 84 the processor 56 causes remapping module 42 to perform the requested operation according to the memory remapping scheme.

In the preferred embodiment, each of the error handling modules 38–44 is implemented using hardware circuitry. Each of the error handling modules 38–44 is coupled to the memory controller processor 56 by address, data, and control lines shown generically in FIG. 1 by a single line connecting each error handling module to the processor 56. Each of the error handling modules 38–44 also is coupled by address, data, and control lines to an interface port 85 coupled to the memory module 12.

The error detection module 38 and error correction module 40 each include conventional circuitry that responds to memory access requests received from the memory controller processor 56. The memory controller processor 56 employs the control lines to inform a selected one of the error detection and error correction modules 38, 40 whether the memory access request includes a read or a write request. If the memory access request includes a write request, then the selected error handling module receives data from the memory controller processor 56 via the data lines. The selected error handling module adds an error detection code (if the error detection module 38 is selected) or an error correction code (if the error correction module 40 is selected) to the data received from the memory controller processor 56 using convention circuitry. If the memory access request includes a read request, then the selected error handling module retrieves data plus an error detection code (if the error detection module 38 is selected) or data plus an error correction code (if the error correction module 40 is selected) from the memory module via the interface port 85. The selected error handling module performs error detection or error correction using conventional circuitry and passes the data to the memory controller processor 56 via the address lines. Each of the error detection and error correction modules 38–40 preferably includes conventional circuitry that converts the address received from the memory controller processor 56 via the address lines to an address sufficiently large to accommodate the added bit or bits of the error detection code or the error correction code. For example, if there are 8 data lines and 8 address lines coupling the memory controller processor 56 to the error detection module 38, then there could be 9 data lines and 9 address lines coupling the error detection module 38 to the interface port 85 to accommodate a single bit error detection code added to the 8 bit data.

The memory remapping module 42 differs from the error detection and error correction modules 38–40 in that the memory remapping module 42 does not add any codes to data being written to the memory module 12. As a result, the data lines coupling the memory controller processor 56 to the memory remapping module 42 are directly coupled to and equal in number to the data lines coupling the memory remapping module 42 to the interface port 85. The memory remapping module 42 simply maps defective memory addresses to non-defective memory addresses as discussed in more detail in co-pending U.S. patent application Ser. No. 08/741,603, attorney docket no. 660082.431, filed on the same date as the present application, and incorporated herein by reference in its entirety.

The null error handling module 44 does not employ any of the error handling schemes discussed above. Rather the null error handling module 44 directly connects the address, data, and control lines from the memory controller processor 56 to the interface port 85.

Figure 3:
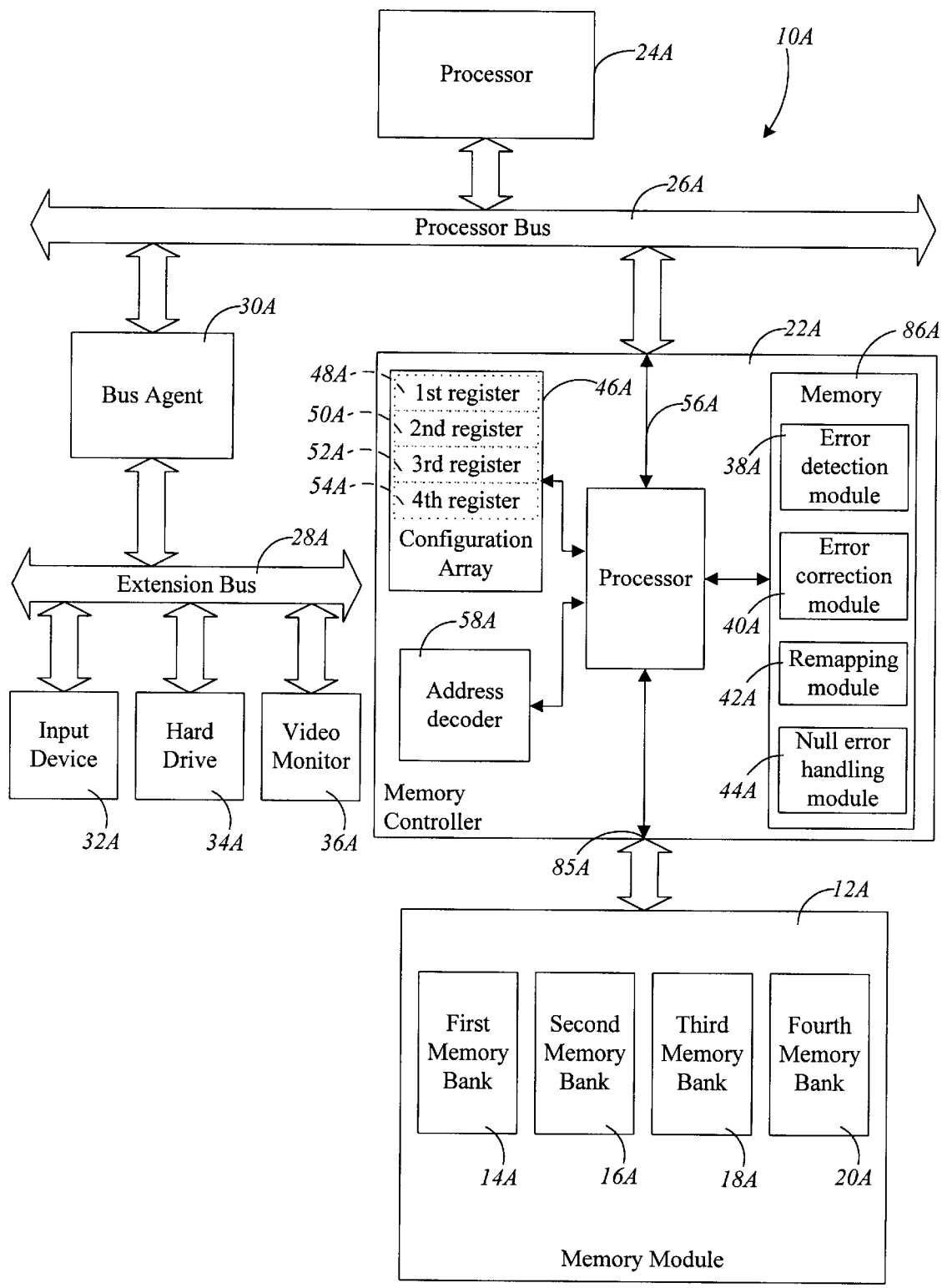
FIG. 3 is a flowchart showing steps for implementing a requested memory operation using error detection according to the preferred embodiment shown in FIG. 2.

An alternate computer system 10A for storing data in the memory module 12 is shown in FIG. 3. The alternate computer system 10A of FIG. 3 is substantially identical to the computer system 10 of FIG. 1 except that the error handling schemes are implemented by software rather than hardware. For simplicity, the following discussion addresses those elements of FIG. 3 that differ from corresponding elements of FIG. 1.

The alternate computer system 10A includes an alternate memory controller 22A that has a processor 56A and a memory 86A. The memory 86A stores software error handling modules 38A, 40A, 42A, 44A that are implemented by the processor 56A. The memory 86A can be implemented using any type of memory, but preferably is implemented using read-only memory (e.g., ROM, PROM, EPROM, etc.) for cost reasons. The processor 56A is coupled to the memory module 12A by address, data, and control lines via an interface port 85A.

Figure 4:
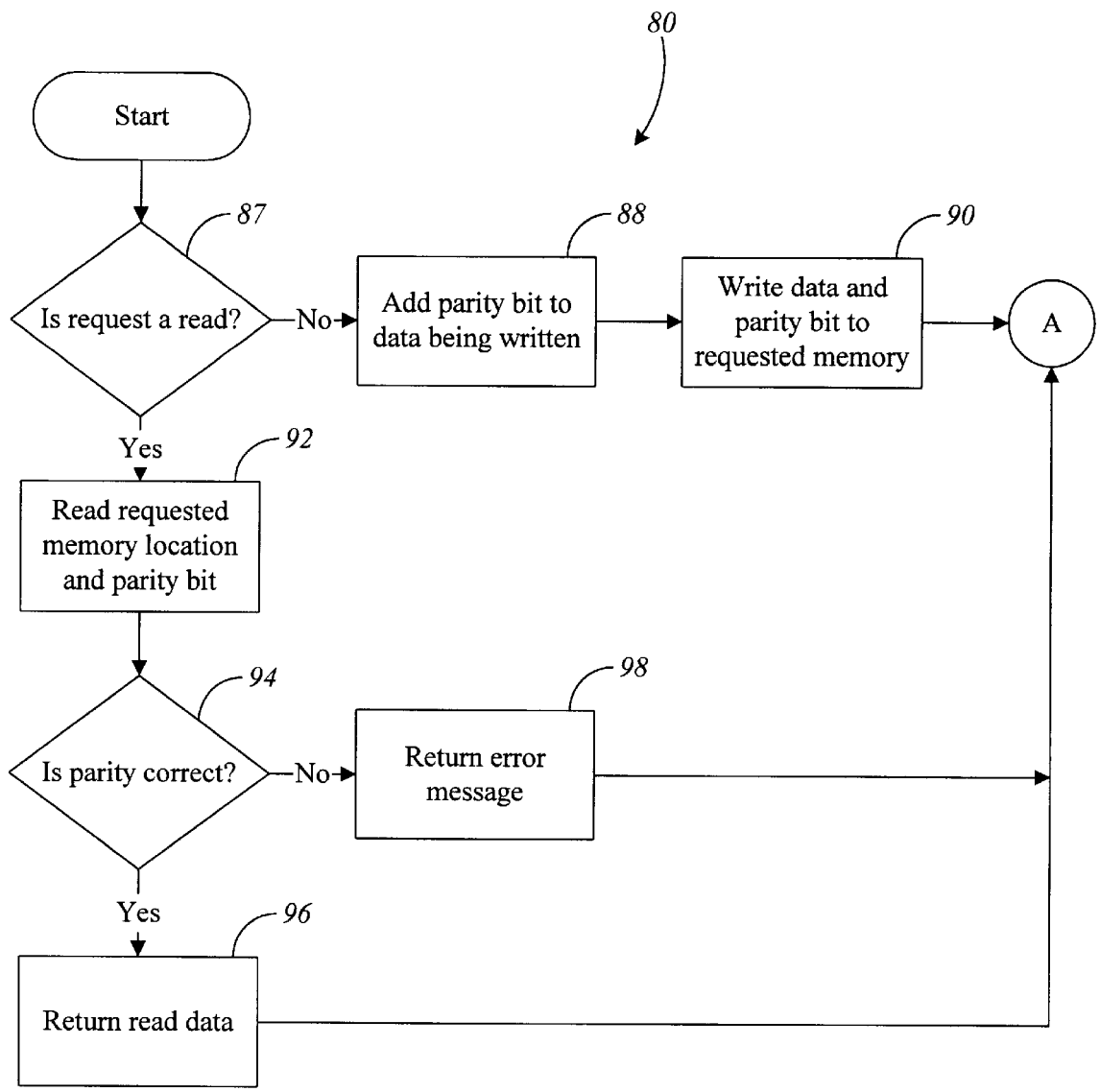
FIG. 4 is a flowchart showing steps for implementing a requested memory operation using error correction according to the preferred embodiment shown in FIG. 2.

A flowchart of the substeps employed by the processor 56A in performing the requested operation with error detection (step 80) using the error detection module 38A according to a preferred embodiment is shown in FIG. 4. In step 87, the processor 56A determines whether a read operation has been requested in the memory access request. If a write operation rather than a read operation has been requested, then in step 88 the processor 56A adds a parity bit to the data word being written to the requested memory bank. The value of the parity bit is selected so that an even number of "1" bits exists in the data word combined with the parity bit. As is well known, an odd number of "1" bits could be employed rather than an even number of "1" bits. In step 90, the error detection module 38 writes the data word and parity bit to the requested memory portion of the requested memory bank. After writing the data in step 90, the method returns to step 72 (FIG. 2) to receive the next memory access request.

If the memory access request is determined to include a read operation in step 86, then in step 92 the processor 56A reads the data and parity bit for the requested memory portion. In step 94, the processor 56A determines whether the parity is correct, that is, whether the data word and parity bit read in step 92 include an even number of "1" bits (odd number if odd parity were employed). If the parity bit is correct, then in step 96 the processor 56A returns the data word read in step 92 to the device that requested the data word. If the parity is determined to be incorrect in step 94, then in step 98 the processor 56A returns an error message to the device that submitted the memory access request. After returning the data word in step 96 or the error message in step 98, the method returns to step 72 (FIG. 2) to receive the next memory access request. A more detailed discussion of error detection can be found in *Memory and Storage*, Time-Life Books, Inc., Chapter 3, 1990, which is incorporated herein by reference.

Figure 5:
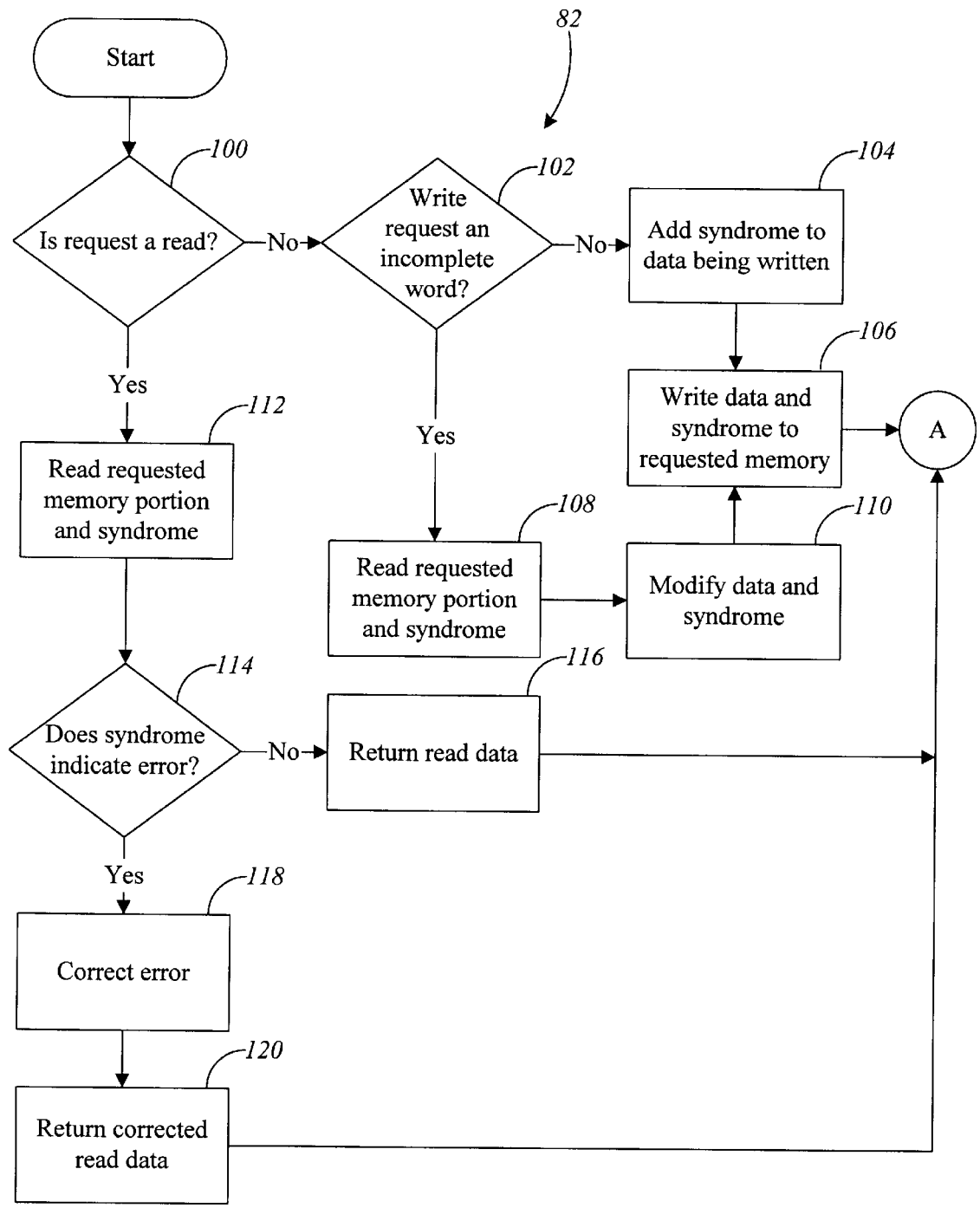
FIG. 5 is a flowchart showing steps for implementing a requested memory operation using memory remapping according to the preferred embodiment shown in FIG. 2.

A flowchart of the substeps employed by the processor 56A in performing the requested operation with error correction (step 82) using the error correction module 40A according to a preferred embodiment is shown in FIG. 5. In step 100, the processor 56A determines whether a read operation has been requested in the memory access request. If not, then in step 102 processor 56A determines whether the requested operation is a write request of an incomplete word, that is, a data portion less than a full data word. For example, if each data word includes 64 bits then an incomplete word is a data portion less than 64 bits.

If a full word is requested to be written ("no" result of step 102), then in step 104 the processor 56A adds an error correction code, known as a syndrome, to the data word being written. The syndrome is calculated based upon the individual bits of the data word in such a manner that when the data word is subsequently read the bit values of the syndrome will not only indicate which, if any, bit of the data word is erroneous, but also the correct values for the erroneous bits. In step 106 processor 56A writes the data word and syndrome to the requested memory bank and then the method returns to step 72 to receive the next memory access request. If the operation requested is a write request of an incomplete word ("yes" result of step 102), then in step 108 the processor 56A reads the entire data word of which the incomplete word is a part, including the syndrome of the data word. In step 110 the processor 56A modifies the syndrome and the portion of the data word represented by the incomplete word of the write request. Then in step 106 the error correction module 40 writes the modified data word and syndrome to the requested memory bank and the method returns to step 72 to receive the next memory access request. A more detailed discussion of syndromes and error correction can be found in the Memory and Storage reference discussed above.

If the memory access request is a read request ("yes" result of step 100), then in step 112 the processor 56A reads the requested memory portion and its associated syndrome from the requested memory bank. In step 114 processor 56A determines whether the syndrome indicates that there is an error in the memory portion that was read in step 112. If not, then in step 160 the processor 56A returns the data that was read in step 112 to the computer system element that requested the data. If the syndrome indicates that there is an error in the data word that was read in step 112, then in step 118 the processor 56A corrects the error using the syndrome. In step 120 the processor 56A returns the corrected data word to the computer system element that transmitted the memory access request. It will be appreciated that the syndrome for each data word could easily be designed to correct any number of errors in the data word. However, the most typical error correction scheme employs a syndrome that can be used to correct only single bit errors in the data word.

Figure 6:
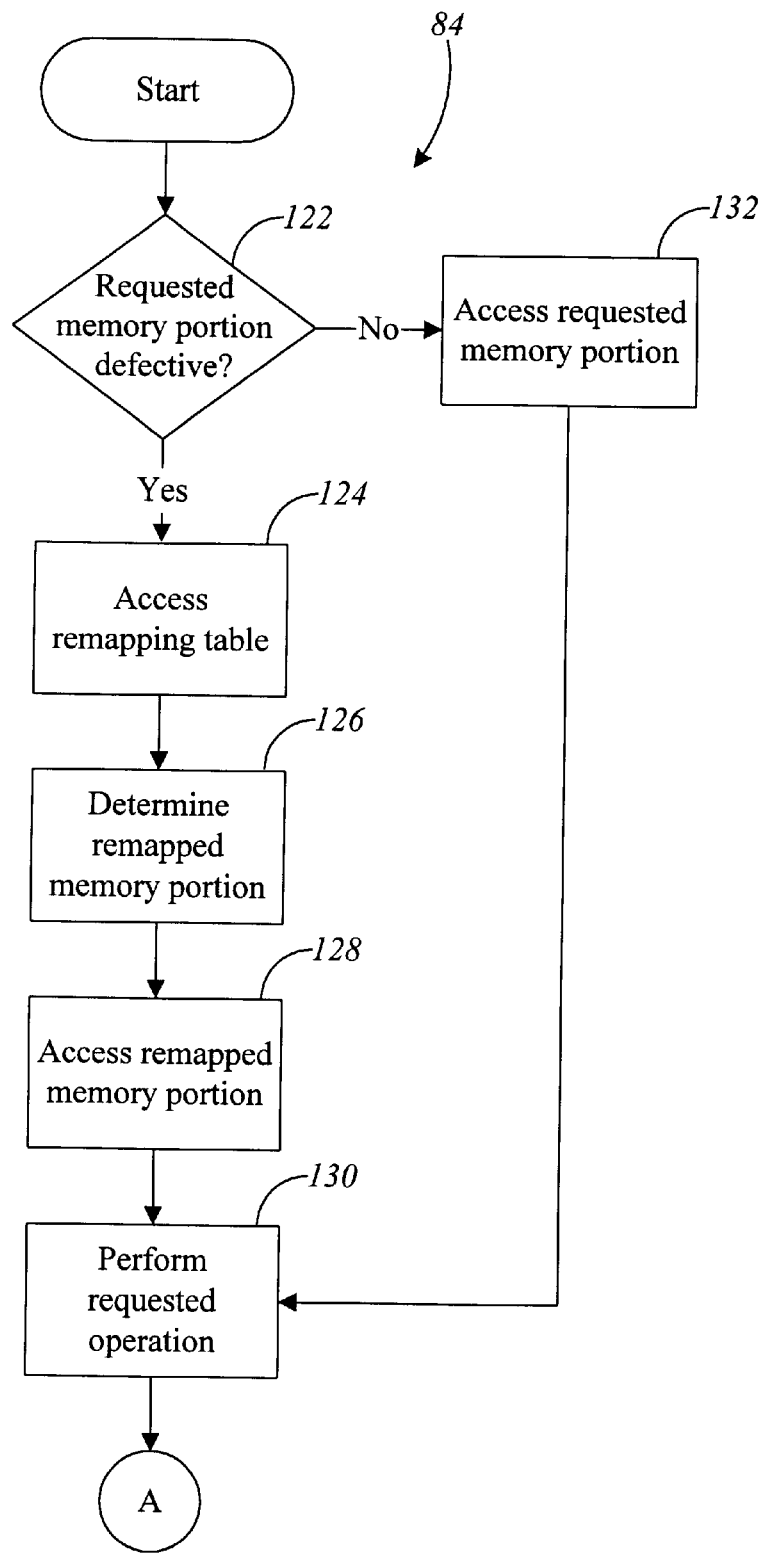
FIG. 6 is a flowchart showing steps for implementing a memory mapping process used by the processor according to the preferred embodiment shown in FIG. 2.

A flowchart of the substeps employed by the processor 56A in performing the requested operation with memory remapping (step 84) using the memory remapping module 42A according to a preferred embodiment is shown in FIG. 6. In step 122 the processor 56A determines whether the requested memory portion is defective. If so, then in step 124 the processor 56A accesses a remapping table that maps each defective memory portion of the requested memory bank to a non-defective memory portion of the requested memory bank. In step 126 the processor 56A determines the non-defective remapped location to which the defective requested memory portion was mapped in the remapping table. The processor 56A then accesses the remapped memory portion in step 128 and performs the requested operation on the remapped memory portion in step 130. If the requested memory portion is not defective ("no" result of step 122), then the processor 56A accesses the requested memory portion in step 132 and performs the requested operation in step 130. A more detailed discussion of memory remapping can be found in co-pending U.S. patent application Ser. No. 08/741,603, attorney docket no. 660082.431, referred to above.

There are various reasons why one would desire to employ different error handling schemes for different memory blocks of the same computer system. For example, memory remapping will work well if the memory block includes consecutive defective memory locations within a horizontal line because memory remapping can map an entire defective memory line to a non-defective memory line. However, if there are sporadic memory errors, e.g., one error or less per data word, or consecutive memory errors in vertical lines, then error correction or detection might be better error handling schemes. In addition, if a particular memory block is being used to store non-critical information, such as music, then a null error handling scheme that does detect errors may be more cost-effective than other error handling schemes.

Based on the foregoing discussion it should be appreciated that a preferred embodiment of the present invention allows each memory bank, other memory block, or even individual memory locations to be accessed according to a different one of plural error handling schemes. As a result, the preferred embodiment provides much more flexibility than prior art computer systems that require all of the memory of a computer system to be accessed according to a single error handling scheme. Thus, the preferred embodiment allows a computer system user or designer to set the error handling scheme of each memory block separately according to the applications to which the memory blocks will be employed and according to the monetary and memory overhead costs desired for each memory block.

It should be understood that even though numerous advantages of the present invention have been set forth in the foregoing description, the above disclosure is illustrative only. Changes may be made in detail and yet remain within the broad principles of the present invention.

I claim:

1. A computer system for storing data, comprising:
   an input device that receives data;
   a processor coupled to the input device and structured to receive the data from the input device and process the data according to a program;
   first and second memory blocks each of which includes at least one memory location that stores data;
   a memory controller communicating with the processor and the first and second memory blocks, the memory controller being structured to perform a memory access operation to the first memory block according to a first error handling scheme and to perform a memory access operation to the second memory block according to a second error handling scheme; and
   a computer-readable storage element that stores both a first indication of which of the first or second error handling schemes will be used to enter data into the first memory block and a second indication of which of the first or second error handling schemes will be used to enter data into the second memory block.

2. The computer system of claim 1 wherein the memory controller comprises:
   a first error handling module associated with the first memory block, the first error handling module being structured to enter data into the first memory block according to the first error handling scheme; and
   a second error handling module associated with the second memory block, the second error handling module being structured to enter data into the second memory block according to the second error handling scheme.

3. The computer system of claim 1 wherein the first error handling scheme includes an error detection scheme and the second error handling scheme includes an error correction scheme.

4. The computer system of claim 1 wherein the computer-readable storage element comprises:
   a first configuration register associated with the first memory block, the first configuration register storing the indication of which of the first or second error handling schemes will be used to enter data into the first memory block; and
   a second configuration register associated with the second memory block, the second configuration register storing the indication of which of the first or second of error handling schemes will be used to enter data into the second memory block.

5. The computer system of claim 1 wherein the memory controller comprises:
   a plurality of error handling modules, each being structured to enter data into a memory block according to a respective error handling scheme;
   a first configuration register associated with the first memory block, the first configuration register storing an indication of which of the plurality of error handling modules is associated with the first memory block;
   a second configuration register associated with the second memory block, the second configuration register storing an indication of which of the plurality of error handling modules is associated with the second memory block; and
   a processor structured to determine whether a memory access request received from a memory requester is directed to the first or second memory blocks, determine from one of the configuration registers which error handling module is associated with the memory block to which the memory access request is directed, and cause the associated error handling module to process the memory access request.

6. The computer system of claim 1 wherein the first error handling scheme is a null scheme that does not acknowledge data or memory location errors.

7. A memory controller for controlling how data is stored on a memory module having first and second memory blocks, the memory controller comprising:
   a first error handling module structured to perform a memory access operation to the memory module according to a first error handling scheme in response to receiving memory access requests;
   a second error handling module structured to perform a memory access operation to the memory module according to a second error handling scheme in response to receiving memory access requests;
   a processor coupled to the error handling modules, the processor being structured to direct to one of the error handling modules a first memory access request for access to the first memory block and direct to one of the error handling modules a second memory access request for access to the second memory block, whereby the error handling module or modules process the memory access requests according to the error handling scheme or schemes of the error handling module or modules.

8. The memory controller of claim 7, further comprising:
   a first configuration memory portion associated with the first memory block, the first configuration memory portion storing an indication of which of the error handling modules will be used to write data to and read data from the first memory block, whereby the processor determines from the first configuration memory portion the error handling module to which to direct memory access requests for access to the first memory block; and
   a second configuration memory portion associated with the second memory block, the second configuration portion storing an indication of which of the error handling modules will be used to write data to and read data from the second memory block, whereby the processor determines from the second configuration memory portion the error handling module to which to direct memory access requests for access to the second memory block.

9. The memory controller of claim 7 wherein the first error handling module is structured to write data to or read data from the memory module without determining whether the memory access requests include data errors or errors in the portions of the memory modules to which the memory access requests are intended.

10. The memory controller of claim 7 wherein the first error handling module is structured to detect errors in the data that the first error handling module writes to or reads from the memory module.

11. The memory controller of claim 7 wherein the first error handling module is structured to determine whether a memory location to which a memory access request is intended is defective and, if so, direct the memory access request to a remapped memory location in the memory module.

12. The memory controller of claim 7, further including:
   an address decoder coupled to the processor, the address decoder providing to the processor an indication of which of the first and second memory blocks a current memory access request is intended; and
   a configuration memory portion associated with the memory block to which the current memory access request is intended, the configuration memory portion providing the processor with an indication of which of the error handling modules is to be employed to process the current memory access request.

13. A computer storage medium for storing data under control of a memory controller, the computer storage medium comprising:
   a first memory block storing data according to an error detection scheme in which an error detection code is associated with each of a plurality of data words stored in the first memory block, wherein for each of the plurality of data words the error code has a value that depends on values of the data word, the error detection code causing the memory controller to detect whether the data word includes an error after the memory controller reads the data word and error detection code; and
   a second memory block storing data according to a memory mapping scheme in which any defective memory portions of the second memory block are identified and these portions are mapped to a non-defective memory portion of the second memory block and the data intended for storing in one of the defective memory portions is instead stored in the non-defective memory portion to which the defective memory portion is mapped.

14. The computer storage medium of claim 13 wherein the first memory block stores data according to a single-bit correction/double-bit detection scheme in which a respective error code is associated with each of a plurality of data words stored in the first memory block, wherein for each of the plurality of data words of the first memory block the error code has a value that depends on values of the data word, the error correction code being structured to enable the memory controller to correct a single-bit error in the data word and to detect a double-bit error in the data word.

15. A computer storage medium for storing data under control of a memory controller, the computer storage medium comprising:
   a first memory block storing data without regard for any errors in the data; and a second memory block storing data according to an error detection scheme in which an error detection code is associated with each of a plurality of data words stored in the first memory block, wherein for each of the plurality of data words the error code has a value that depends on values of the data word, the error detection code causing the memory controller to detect whether the data word includes an error after the memory controller reads the data word and error detection code.

16. The computer storage medium of claim 15 wherein the second memory block stores data according to an error correction scheme in which an error correction code is associated with each of a plurality of data words stored in the second memory block, wherein for each of the plurality of data words of the second memory block the error correction code has a value that depends on values of the data word, the error correction code causing the memory controller to correct an error in the data word after the memory controller reads the data word and error correction code, the error correction scheme including the error detection scheme.

* * * * *

UNITED STATES PATENT AND TRADEMARK OFFICE
CERTIFICATE OF CORRECTION

PATENT NO. : 5,905,858
DATED : May 18, 1999
INVENTOR(S) : Jeddeloh

It is certified that error appears in the above-identified patent and that said Letters Patent is hereby corrected as shown below:

<u>Title page, item [54],</u>
The title reads "System For Method Memory Error" should read -- System For Memory Error --

Signed and Sealed this

Thirtieth Day of October, 2001

*Attest:*

*Attesting Officer*

NICHOLAS P. GODICI
*Acting Director of the United States Patent and Trademark Office*